United States Patent
Michelsen

(10) Patent No.: US 10,565,086 B2
(45) Date of Patent: Feb. 18, 2020

(54) SERVICE MODELING AND VIRTUALIZATION

(71) Applicant: CA, Inc., Islandia, NY (US)

(72) Inventor: John J. Michelsen, Arlington, TX (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/626,867

(22) Filed: Feb. 19, 2015

(65) Prior Publication Data
US 2015/0205708 A1 Jul. 23, 2015

Related U.S. Application Data

(63) Continuation of application No. 13/341,650, filed on Dec. 30, 2011, now Pat. No. 9,323,645, which is a
(Continued)

(51) Int. Cl.
*G06F 11/34* (2006.01)
*G06F 11/36* (2006.01)
(Continued)

(52) U.S. Cl.
CPC ............ *G06F 11/3457* (2013.01); *G06F 8/70* (2013.01); *G06F 11/3447* (2013.01);
(Continued)

(58) Field of Classification Search
CPC .......................... G06F 11/3447; G06F 11/3457
(Continued)

(56) References Cited

U.S. PATENT DOCUMENTS 5,345,587 A * 9/1994 Fehskens ................ H04L 29/00
718/102
5,450,586 A * 9/1995 Kuzara ............... G06F 11/3466
714/1
(Continued)

OTHER PUBLICATIONS

Wikipedia, "Mock Object," Sep. 23, 2008, printed May 31, 2009, http://en.wikipedia.org/wiki/Mock_object, pp. 1-5.
(Continued)

*Primary Examiner* — Akash Saxena
(74) *Attorney, Agent, or Firm* — Alliance IP, LLC

(57) ABSTRACT

The systems and methods described herein can be used to provide virtual service environments. In one embodiment, a virtual service model is generated by detecting one or more transactions, each of which includes a request sent from a requester to a software service and a response sent from the software service to the requester; storing information describing the detected transactions in a virtual service model, where the information describing each transaction includes information identifying a command included in the request and information identifying a response attribute included in the response; and generating information describing an unknown transaction, where the information describing the unknown transaction includes information identifying a first command and information identifying a first response attribute. The first command and the first response attribute are copies of a corresponding command and a corresponding response attribute associated with a corresponding one of the detected transactions.

24 Claims, 7 Drawing Sheets

Related U.S. Application Data continuation of application No. 12/242,783, filed on Sep. 30, 2008, now Pat. No. 8,112,262.

(51) Int. Cl.
*G06Q 40/00* (2012.01)
*G06F 8/70* (2018.01)

(52) U.S. Cl.
CPC ...... *G06F 11/3461* (2013.01); *G06F 11/3664* (2013.01); *G06F 11/3688* (2013.01); *G06F 11/3696* (2013.01); *G06Q 40/00* (2013.01); *G06F 11/3644* (2013.01)

(58) Field of Classification Search
USPC ....................................................... 717/135
See application file for complete search history.

(56) References Cited

U.S. PATENT DOCUMENTS

| | | | | |
|---|---|---|---|---|
| 5,576,965 | A * | 11/1996 | Akasaka | G06F 17/50 700/97 |
| 6,122,627 | A | 9/2000 | Carey et al. | |
| 6,134,540 | A | 10/2000 | Carey et al. | |
| 6,810,368 | B1 * | 10/2004 | Pednault | G06F 17/18 703/2 |
| 6,879,946 | B2 | 4/2005 | Rong et al. | |
| 6,883,162 | B2 * | 4/2005 | Jackson et al. | 717/124 |
| 6,957,199 | B1 | 10/2005 | Fisher | |
| 7,376,549 | B2 * | 5/2008 | Horikawa | 703/22 |
| 7,437,710 | B2 * | 10/2008 | Bau et al. | 717/117 |
| 7,487,508 | B2 * | 2/2009 | Fu et al. | 719/310 |
| 7,539,980 | B1 * | 5/2009 | Bailey et al. | 717/135 |
| 7,552,036 | B2 * | 6/2009 | Oslake et al. | 703/2 |
| 7,676,538 | B2 * | 3/2010 | Potter et al. | 709/200 |
| 7,783,613 | B2 * | 8/2010 | Gupta et al. | 707/693 |
| 7,805,496 | B2 * | 9/2010 | Aiber et al. | 709/217 |
| 7,873,594 | B2 * | 1/2011 | Harada et al. | 707/603 |
| 7,966,193 | B2 * | 6/2011 | Kryskow et al. | 705/1.1 |
| 8,060,864 | B1 | 11/2011 | Michelsen | |
| 8,112,262 | B1 * | 2/2012 | Michelsen | G06F 11/3688 703/13 |
| 8,538,740 | B2 * | 9/2013 | Kumar et al. | 703/22 |
| 8,898,681 | B1 * | 11/2014 | Acheff | G06F 11/36 719/317 |
| 8,935,573 | B2 * | 1/2015 | Horsman | G06F 11/3684 714/32 |
| 9,201,767 | B1 * | 12/2015 | Tarlton | G06F 11/3672 |
| 9,323,645 | B2 | 4/2016 | Michelsen | |
| 9,531,609 | B2 * | 12/2016 | Talbot | G06F 16/188 |
| 9,727,314 | B2 * | 8/2017 | Michelsen | G06F 8/35 |
| 9,813,504 | B2 * | 11/2017 | Kumar | H04L 67/14 |
| 10,114,736 | B2 * | 10/2018 | Lau | G06F 11/3668 |
| 2001/0016876 | A1 * | 8/2001 | Kurth | H04L 41/142 709/223 |
| 2002/0010781 | A1 | 1/2002 | Tuatini | |
| 2003/0055670 | A1 * | 3/2003 | Kryskow et al. | 705/1 |
| 2003/0101436 | A1 * | 5/2003 | Kobrosly | G06F 8/41 717/128 |
| 2003/0217162 | A1 * | 11/2003 | Fu et al. | 709/229 |
| 2004/0078782 | A1 * | 4/2004 | Clement et al. | 717/116 |
| 2004/0128259 | A1 | 7/2004 | Blakeley et al. | |
| 2004/0162778 | A1 | 8/2004 | Kramer et al. | |
| 2004/0230674 | A1 | 11/2004 | Pourheidari et al. | |
| 2004/0243334 | A1 * | 12/2004 | Wrigley | H04L 43/50 702/108 |
| 2004/0243338 | A1 * | 12/2004 | Sabiers | G06F 11/3495 702/122 |
| 2005/0027648 | A1 | 2/2005 | Knowles et al. | |
| 2005/0063335 | A1 | 3/2005 | Shenfield et al. | |
| 2005/0198401 | A1 * | 9/2005 | Chron | H04L 12/413 709/250 |
| 2005/0289231 | A1 * | 12/2005 | Harada et al. | 709/224 |
| 2006/0224375 | A1 * | 10/2006 | Barnett et al. | 703/22 |
| 2006/0235675 | A1 * | 10/2006 | Oslake et al. | 703/21 |
| 2007/0006177 | A1 * | 1/2007 | Aiber et al. | 717/136 |
| 2007/0033442 | A1 * | 2/2007 | Tillmann | G06F 11/3684 714/45 |
| 2007/0073682 | A1 * | 3/2007 | Adar | G06F 17/30861 |
| 2007/0169003 | A1 * | 7/2007 | Branda et al. | 717/130 |
| 2007/0261035 | A1 * | 11/2007 | Duneau | 717/135 |
| 2007/0277158 | A1 * | 11/2007 | Li et al. | 717/135 |
| 2008/0010074 | A1 * | 1/2008 | Brunswig | G06Q 10/06 717/108 |
| 2008/0059625 | A1 * | 3/2008 | Barnett | G06F 11/3495 709/223 |
| 2008/0120129 | A1 * | 5/2008 | Seubert et al. | 705/1 |
| 2008/0127093 | A1 | 5/2008 | Fernandez-Ivern et al. | |
| 2009/0064149 | A1 * | 3/2009 | Singh et al. | 718/101 |
| 2009/0094684 | A1 | 4/2009 | Chinnusamy et al. | |
| 2009/0119301 | A1 * | 5/2009 | Cherkasova et al. | 707/10 |
| 2009/0187534 | A1 * | 7/2009 | Broil et al. | 707/2 |
| 2009/0204669 | A1 * | 8/2009 | Allan | G06F 15/173 709/203 |
| 2009/0234710 | A1 | 9/2009 | Hassine et al. | |
| 2009/0282403 | A1 * | 11/2009 | Poole | H04L 67/34 717/178 |
| 2009/0298458 | A1 | 12/2009 | Bakker et al. | |
| 2010/0017401 | A1 * | 1/2010 | Higuchi | H04L 43/18 707/E17.109 |
| 2010/0037100 | A1 * | 2/2010 | Lopian | G06F 11/3688 714/35 |
| 2010/0145962 | A1 * | 6/2010 | Chen | G06F 16/24558 707/758 |
| 2010/0318974 | A1 * | 12/2010 | Hrastnik | G06F 11/3696 717/135 |
| 2012/0059868 | A1 * | 3/2012 | Buckl et al. | 709/201 |
| 2012/0084754 | A1 * | 4/2012 | Ziegler | G06F 11/3696 717/124 |
| 2014/0108589 | A1 * | 4/2014 | Dhanda | G06F 11/3696 709/217 |
| 2014/0223418 | A1 * | 8/2014 | Michelsen | G06F 11/3696 717/135 |
| 2015/0205699 | A1 | 7/2015 | Michelsen | |
| 2015/0205700 | A1 | 7/2015 | Michelsen | |
| 2015/0205701 | A1 | 7/2015 | Michelsen | |
| 2015/0205702 | A1 | 7/2015 | Michelsen | |
| 2015/0205703 | A1 | 7/2015 | Michelsen | |
| 2015/0205712 | A1 | 7/2015 | Michelsen | |
| 2015/0205713 | A1 | 7/2015 | Michelsen | |
| 2015/0234731 | A1 * | 8/2015 | Williams | G06F 11/3684 717/126 |
| 2016/0125052 | A1 * | 5/2016 | Dahan | G06F 16/256 707/705 |
| 2016/0239409 | A1 * | 8/2016 | de Oliveira Staudt | G06F 11/3688 |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.com/questions/19899236/is-tcp-protocol-statelessor-not" pp. 1-3 (2013).

* cited by examiner

| Service Model 40 | | | |
|---|---|---|---|
| Transaction 201(A) | Command 211 | Observed Attribute(s) 221(1) | Observed Characteristic(s) 231(1) | Observed Response 241(1) |
| Transaction 201(B) | Command 211 | Observed Attribute(s) 221(2) | Observed Characteristic(s) 231(2) | Observed Response 241(2) |
| ... | | | |
| Transaction 201(n+1) | Command 211 | Unknown Attribute(s) 221(n+1) | Default Characteristic(s) 231(n+1) | Default Response 241(n+1) |
| Transaction 202(A) | Command 212 | Observed Attribute(s) 222(1) | Observed Characteristic(s) 232(1) | Observed Response 242(1) |
| Transaction 202(B) | Command 212 | User-Specified Attribute(s) 222(2) | User-Specified Characteristic(s) 232(2) | User-Specified Response 242(2) |
| ... | | | |
| Transaction 202(m+1) | Command 212 | Unknown Attribute(s) 222(m+1) | Default Characteristic(s) 232(m+1) | Default Response 242(m+1) |
| Transaction 203 | Unknown Command 213 | Unknown Attribute(s) 223 | Default Characteristic(s) 233 | Default Response 243 |

*FIG. 2*

Conversation 1:
1.1 getFlightInfo(CityA, CityB)
1.2 capacity
1.3 reserveFlight
1.4 seat Conversation 2:
2.1 getFlightInfo(CityC, CityD)
2.2 reserveFlight Conversation 3:
3.1 getFlightInfo(CityA, CityD)
3.2 capacity
3.3 seat
3.4 reserveFlight

US 10,565,086 B2

SERVICE MODELING AND VIRTUALIZATION

CROSS-REFERENCE TO RELATED APPLICATIONS

This Application is a continuation and claims the benefit of priority under 35 U.S.C. § 120 of U.S. application Ser. No. 13/341,650 filed on Dec. 30, 2011 and entitled "Service Modeling and Virtualization", which application is a continuation of U.S. patent application Ser. No. 12/242,783, filed Sep. 30, 2008, now issued as U.S. Pat. No. 8,112,262 and entitled "Service Modeling and Virtualization", naming John J. Michelsen as inventor. The disclosures of the prior Applications are considered part of and are incorporated by reference in the disclosure of this Application.

FIELD OF THE INVENTION

This invention relates to testing and, more particularly, to systems for testing software that depends on and/or interacts with a constrained service that may not always be available for use during testing.

DESCRIPTION OF RELATED ART

As software becomes more sophisticated, it becomes more difficult to quickly and easily perform thorough software testing. One such difficulty arises when software testing involves testing the ability of a program or application under test to interact with a constrained software resource, such as a database, metered partner service, or the like. For example, an airline may be reluctant to test a new reservation application against the airline's live production database in order to avoid negatively impacting (e.g., in terms of database response time) actual consumer transactions that will be taking place at the same time as testing. Similarly, in order to reduce costs, a financial institution may wish to minimize interactions between a new credit card application system and a partner service due to per-transaction fees, such as those that are charged for each credit check, charged by the partner service. In yet another example, the constrained service may still be in development and thus not yet available to interact with the application under test. As the above examples show, it is desirable to be able to test the application under test in a manner that avoids interacting with the actual constrained service, while also obtaining test results that indicate whether the application under test will ultimately be able to properly interact with the constrained service.

BRIEF DESCRIPTION OF THE DRAWINGS

A more complete understanding of the present invention may be acquired by referring to the following description and the accompanying drawings, in which like reference numbers indicate like features.

FIG. 2 shows information that can be maintained as part of a model of a service, according to one embodiment of the present invention.

Figure 1:
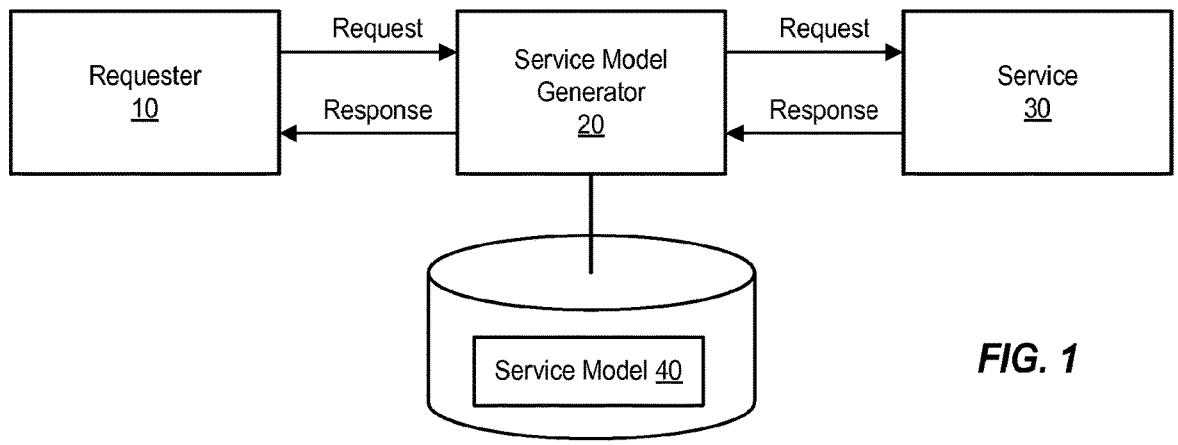
FIG. 1 is a block diagram of a system that generates a model of a service, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Various embodiments of the systems and methods described herein can be used to provide virtual service environments. These virtual service environments can be used for various purposes, including development, testing, load testing, integration testing, and training. In many situations, the services to virtualize within virtual service environments can be identified during the software design phase, and then the identified services can be virtualized and implemented within virtual service environments during the development phase. The virtual service environments can then be used throughout the development and testing phases.

The virtual service environments operate to present one or more virtual services. Each virtual service responds to requests in a manner that is structurally consistent with the service being virtualized. Providing virtual services allows an application (e.g., an application under test or an application being used for training purposes) to interact with a virtualized representation of a software service that might not otherwise be readily available (e.g., due to constraints associated with that software service) for testing or training purposes.

FIG. 1 is a block diagram of a system that generates a model of a software service. This system includes a requester 10, a service model generator 20, and software service 30. In many embodiments, these components are each implemented in software that is executing on a computing device (e.g., a personal computer, server, personal digital assistant, telephone, or the like). The components shown in FIG. 1 can all be implemented on the same computing device. However, in many embodiments, at least some of these components (or portions thereof) will be implemented on different computing devices, all or some of which can be coupled via one or more networks (e.g., a local area network, storage area network, and/or wide area network such as the Internet).

Service 30 can be any of a variety of different services and can be implemented as any one or more of a variety of software components. For example, service 30 can be a database server that is configured to respond to requests to access information stored in a database. Alternatively, service 30 can be a web service (e.g., having an interface defined by a web service definition language (WSDL) file), a web site (e.g., as implemented by one or more web pages provided by a web server), a legacy application operating on a mainframe, a data service, an order manager, a transactional data store, an enterprise resource planning (ERP) system, an enterprise application integration (EAI) system, or the like. Service 30 can be implemented as an object or other component (e.g., an enterprise service bus (ESB) construct, an Enterprise JavaBean (EJB), a web component such as a JavaServer Pages (JSP) page or Java servlet component, other standalone Java component, or Java applet), as an application that includes any of the previously-mentioned components, or the like.

Requester 10 can similarly be implemented as any of a variety of different software components (or a combination of such components). In some embodiments, there may be multiple independent requesters present and generating requests at substantially the same time. In such embodiments, service model generator 20 can detect requests being generated by more than one requester, as well as the responses provided in response to those different requesters' requests.

As shown in FIG. 1, requester 10 generates a request, which is sent to service 30. In response to receiving the request, service 30 generates a response and returns the response to requester 10. Service model generator 20 is coupled (e.g., logically and/or physically) between requester 10 and service 30, such that service model generator 20 can effectively observe and record the traffic (i.e., the requests and responses) being exchanged between requester 10 and service 30. For recording purposes, each request and its corresponding response are grouped together, and a group containing a request and its corresponding response is referred to herein as a transaction. The recorded transactions are stored as a service model 40, which will be used to implement a virtual service environment that virtualizes service 30, as will be described in more detail below with respect to FIGS. 4-6. An example of the information that can be stored as part of a service model is provided in FIG. 2.

A user can also provide information describing transactions to service model generator 20 for inclusion in service model 40. Such transactions are referred to as user-supplied transactions, in contrast to the observed transactions that are recorded in response to service model generator 20 actually observing traffic being exchanged between requester 10 and service 30.

Service model generator 20 can also generate and store information identifying one or more characteristics of the transactions. Such information can include timing information identifying times at which particular requests and/or responses are detected or sent (e.g., in order to identify the delay between when the request was detected and/or sent and when the associated response was detected and/or sent), information identifying current bandwidth usage of a network on which the traffic is being conveyed, information identifying current processor and/or memory usage on one or both of the computing devices implementing requester 10 and service 30, and the like. Service model generator 20 can store such information as part of service model 40.

Service model generator 20 is configured to detect and record traffic at the network and/or communication protocol level. The particular communication protocol can vary according to the type of service provided by service 30. Service model generator 20 can be configured to identify requests and responses in each of a variety of different protocols and to extract and record the pertinent information from each. Thus, service model generator 20 can include configuration information identifying the basic structure of requests and responses for each of several supported communication protocols. When generating service model 40, service model generator 20 can access the appropriate configuration information in order to process the observed traffic. Depending upon the protocol in use, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

In order to be able to detect and record traffic, service model generator 20 is configured to logically insert itself into the communication pathway between requester 10 and service 30. In some embodiments, inserting service model generator 20 into the communication pathway can also involve modifying requester 10 and/or software (e.g., such as a driver) with which requester 10 interacts. For example, if service 30 is a web site or web service, service model generator 20 can be configured as a web proxy or gateway, and requester 10 can be modified to communicate with service 30 via the proxy or gateway implemented by service model generator 20. In such a situation, when service model generator 20 receives a request being sent to the proxy, service model generator 20 can generate and store information identifying the request and/or any desired request characteristics, and then service model generator 20 can send the request to service 30. If needed, service model generator 20 can modify the request before sending the request to service 30, so that the response generated by service 30 will be returned to service model generator 20.

Various other configurations of service model generator 20 are possible. For example, if requester 10 and service 30 communicate via messaging, service model generator 20 can be configured to monitor the appropriate queue(s) and topics for new messages being exchanged between requester 10 and service 30. If service 30 is a database, the driver manager used by requester 10 can be modified to indicate that service model generator 20 is the driver for the database, such that requests sent to the database will be provided to service model generator 20, and such that responses provided by the database will be returned to the requester via service model generator 20. If service 30 is an object, service model generator 20 can be configured to intercept method calls to the object, generate information identifying those method calls to be stored as part of service model 40, and then to pass the method call to the object being called. Similarly, service model generator 20 can intercept responses from the object being called, store information identifying those responses as part of service model 40, and then provide those responses to requester 20.

In some embodiments, the functionality provided by service model generator 20 is distributed throughout a networked system. For example, a component of service model generator 20 that is configured to monitor requests and responses sent according to a particular transport and/or data communication protocol can be deployed on each client system that includes a requester 10 and/or each system that implements service 30. This component can be configured to communicate requests and responses to another component of service model generator 20 that is configured to manipulate such information and/or to store such information with a service model 40.

Each request includes a command. The command can be the operation included in a SOAP message, the method being invoked on an object, a database command, a particular command or operation specified by a communication protocol, or the like. Whenever service model generator 20 detects a request, service model generator 20 can identify the command contained within that request (e.g., using configuration information associated with the type of protocol in use in order to identify which portion of the request contains command information) and store information identifying that command as part of service model 40.

Requests may also include attributes. For example, the request can include a command to perform a login operation as well as attributes that include the user name and password to be used in the login operation. Accordingly, service model generator 20 can also parse requests in order to identify whether any attributes are present and, if so, to extract and store information identifying those attributes. Thus, information identifying a request in service model 40 can include information identifying a command as well as information identifying any attributes present within the request.

Responses can include one or more attributes. Whenever service model generator 20 detects a response, service model generator 20 parses that response (e.g., using protocol-specific configuration information in order to determine how to locate the attributes within the response). Service model generator 20 can then store each attribute detected within the response as part of the information identifying the response within service model 40.

When service model 40 is used to virtualize service 30 (as will be explained in greater detail below), the virtualization process will involve comparing new requests generated by a requester to the request information stored in service model 40. For example, if a new request containing a particular command and attribute is received, service model 40 can be searched for a matching request that contains the same command and attribute. If a matching request is found, the virtualization process returns the response (as identified by information stored in service model 40) associated with the matching request to the requester.

In many situations, the requests provided to the virtualized service will not be exactly the same (i.e., containing the same request as well as the same attribute(s)) as the requests identified in service model 40. For example, a request provided to the virtualized service may contain the same request but a different attribute or set of attributes. Accordingly, service model generator 20 is also configured to generate information usable to handle these requests and to store that information as part of service model 40.

In order to generate this additional information, service model generator 20 can identify each unique type of transaction that has been observed or specified by a user. For example, in some embodiments, service model generator 20 can be configured to identify all transactions containing requests that specify the same command as being of the same transaction type. Alternatively, service model generator 20 can be configured to identify a set of transactions as being of the same type if all of those transactions have requests that include the same command as well as the same number and type of attributes. The particular technique used to identify whether two or more transactions are of the same type can be protocol specific, in some embodiments (e.g., service model generator 20 can use different techniques to classify transactions depending upon the particular communication protocol being used between the requester and the service).

For each unique type of transaction included in service model 40 (e.g., obtained either via observation of communication or via user specification), service model generator 20 can generate additional information that can be used to model service 30's response to a similar transaction of that type that contains an unknown attribute (i.e., an unknown attribute in this context is an attribute that was not observed as part of the monitored traffic or specified by a user during the model building process). For example, service model generator 20 can observe and record three different simple object access protocol (SOAP) requests that include the "getUser" command, and a user can specify a fourth "getUser" transaction for inclusion in service model 40. In response to identifying that these transactions are the same type of transaction, service model generator 20 generates information describing a fifth "getUser" transaction that will be used to handle transactions of that type that specify unknown attributes. This information for the fifth transaction can include information identifying the request by the "getUser" command as well as information identifying the appropriate structure, if any, of the request (e.g., by identifying the number and/or type of attributes that can be included in the request, as determined from the other four transactions of that type). The information describing the attributes of the request of this transaction can be wildcard information or otherwise indicate that any unknown attribute(s) (i.e., attributes that are not the same as the attribute(s) in the observed and user-specified transactions) should match this request's attribute information.

The information describing the fifth transaction also includes information identifying an appropriate response. In one embodiment, service model generator 20 generates this response information by simply copying the response portion of the information describing one of the other four "getUser" transactions into the information describing the response portion of the fifth transaction. Service model generator 20 can also or alternatively prompt a user to select the particular transaction from which this response information should be copied.

Similarly, service model generator 20 can also generate information describing a transaction that is used to model service 30's response to an unknown request (i.e., an unknown request in this context is a request that contains a command that was not observed as part of the monitored traffic or specified by a user during the model building process). The request portion of this generated information can indicate (e.g., through the use of a wildcard command identifier) that all unknown types of requests that are not otherwise identified in service model 40 should match this request. The response portion of the generated information can include an appropriate response. In some embodiments, the response is protocol-specific and can be obtained, for example, from protocol-specific configuration information accessed by service model generator 20. Alternatively, service model generator 20 can prompt a user for the appropriate response to include in this transaction.

In some embodiments, service model generator 20 can provide (or otherwise be configured via) a user interface (e.g., such as user interface 480 of FIG. 4) that allows a user to configure service model generator 20 to generate a particular service model. Such a user interface can be a graphical user interface, command line interface, or the like.

The configuration process for service model generator 20 can involve the user selecting, via the user interface, the particular service 30 to be modeled. As part of the configuration process, the user can be prompted to enter information identifying a specific service to be modeled (e.g., service 30), as well as information identifying or indicating the protocol(s) used to communicate with the identified service. For example, the user can identify a specific service by indicating the network port used to communicate with that service, as well as that hyper text transfer protocol (HTTP) and SOAP are used to communicate with that service. In response to this information being provided, service model generator 20 can insert itself in between the requester and the service to be modeled. For example, an instance of an observation module (not shown) that is configured to obtain request and response information for the specified transport and/or data communication protocols can be instantiated. This observation module is part of service model generator 20 and performs the functions needed to obtain information describing the requests generated by the requester and the corresponding responses generated by the service.

Service model generator 20 can also provide a user interface that includes one or more controls that allow a user to configure, start, and stop the model building process. Another control can allow a user to save a model generated by service model generator 20. Yet another control can allow a user to modify a model generated by service model generator 20 (e.g., a user can be allowed to modify or delete all or some of the information generated by service model generator 20). Similarly, a user can be allowed to modify a model by adding additional information (e.g., identifying new types of requests and associated responses, identifying new attributes for a particular type of requests and associated responses, and/or identifying responses to be used for unknown requests).

Thus, service model generator 20 can begin and end the model building process in response to user input provided at the time that modeling should begin and end. Alternatively, instead of selecting a "start" or stop" option, the user can specify a time and/or conditions under which model building should begin, as well as a time and/or conditions under which model building should end. For example, a user can specify that model building should begin at 1:00 AM on a particular date, and continue until 3000 transactions have been recorded. Similarly, a user can specify that model building should begin when a particular type of request is detected, and continue until the user selects to end the model building process.

Furthermore, the model building process can be restarted. For example, a user can cause service model generator 20 to generate a model of a particular service. At a future point in time, the user can restart the model building process for the same service, causing service model generator 20 to generate additional information to include in the service model for that service. Similarly, a user may select to edit an existing service model in order to add additional virtual functionality (e.g., in the form of new types of transactions and/or additional transactions of an existing type) to the model.

In some situations, instead of creating at least a portion of a model based upon actual observed traffic, service model generator 20 can create a model based only upon user input specifying particular transactions (information describing additional observed transactions could be added at a later time). For example, if such information is not already available, service model generator 20 can prompt a user for information identifying the service to be modeled, as well as information indicating the protocol used to communicate with the service to be modeled. Service model generator 20 can then prompt the user for appropriate information (e.g., given the type of service being modeled and the communication protocol(s) used to communicate with that service) identifying one or more transactions. This information can include information identifying a request (e.g., by identifying the command contained within that request, as well as any attributes provided as part of that request) and a corresponding response (e.g., by identifying one or more attributes contained within the response), as well as information identifying a characteristic of that request and/or response. In situations in which service 30 is not available (e.g., because service 30 is still being developed), all of the transactions identified in service model 40 can be obtained via user input instead of via traffic observation.

In one embodiment, a user can specify multiple transactions at once. For example, when prompted, a user can select a file (e.g., a spreadsheet file) that contains information describing many different transactions. Such a file can be, for example, a production log that describes the activity taking place in a production system during a normal period of operation. In response to the user specifying the file, service model generator 20 can access the file, extract the relevant information, and store the extracted information in the model. In some embodiments, service model generator 20 can access an appropriate configuration file that indicates how particular fields in the production log (or other file specified by the user) map to the different types of information maintained in the service model (e.g., the particular configuration file to access can be specific to the service, the protocol(s) used to communicate with the service, or the like).

As noted above, a user can also modify the information describing one or more observed transactions. In some embodiments, a user can relax the matching criteria associated with a transaction. For example, an observed request can include a command requesting for flight information from a particular origination city to a particular destination city, and the virtual service model may default to matching only requests that include the same command and attributes. A user can select to modify the information describing this command and can replace one or more of the request attributes with special values (e.g., wildcard values) and/or select a matching setting (e.g., specifying exact matching, regular expressions, "starts with" matching, "contains" matching, or the like) for one or more particular request attributes. Thus, the user could modify the transaction requesting flight information to indicate that all requests for flight information that include the same destination city attribute as the observed transaction should match the observed transaction, regardless of whether such requests also specify the same origination city as the observed transaction. Users can also modify information describing observed transactions in order to replace observed attributes with user-specified attributes and the like.

In many situations, transactions are stateless, such that each transaction is independent of any transactions that have taken place beforehand. In other words, for a stateless transaction, service 30 will generate the same response to a given request, regardless of whether any other transactions have already been performed. In such situations, service model generator 20 generates information identifying each observed transaction in the same manner, regardless of whether any other prior transactions have been observed and regardless of the attributes and commands contained within such prior transactions.

In other situations, transactions are stateful, such that the response included in a given transaction may differ depending upon what transaction or transactions have already been performed. In these situations, service model generator 20 is configured to generate additional state information for each transaction. This additional state information identifies the preceding transaction (the state information for the preceding transaction can also be modified to identify the subsequent transaction). More information regarding stateful transactions is provided in the discussion of FIG. 6.

FIG. 2 shows information that can be maintained as part of a model of a service. Such a model can be generated by a service model generator such as the one shown in FIG. 1. In this example, service model 40 includes a row for each of several transactions. Each row of service model 40 identifies a command, zero or more attributes, zero or more characteristics, and one or more response attributes. This service model can be stored in a spreadsheet, table, database, or any other data structure.

In this example, transaction 201(A) is an observed transaction. In other words, transaction 201(A) is a transaction that actually occurred between a requester and the service being modeled, as detected by a service model generator. The information describing transaction 201(A) includes request information, which includes command 211 and zero or more observed attributes 221(1). The information describing transaction 201(A) also includes response information 241(1) describing the observed response that corresponds to the observed request. This response information 241(1) can also include one or more attributes. Observed characteristics 231(1) can include zero of more observed characteristics of transaction 201(A). These observed characteristics can include timing information describing when the request and/or response were observed or the like, as described above.

Like transaction 201(A), transaction 201(B) is a transaction that actually occurred (i.e., an observed transaction). Transaction 201(B) is of the same transaction type as transaction 201(A), since both transactions included a request that contained command 211. Transaction 201(B) is described by observed attributes 221(2) (which can have values that differ from those attributes observed in the request of transaction 201(A)), observed characteristics 231 (2) (which can again differ from those observed for transaction 201(A)), and observed response 241(2) (which can also have a value that differs from the response observed for transaction 201(A)).

In this example, information describing n (an integer number) known transactions of the same type as transactions 201(A) and 201(B) is stored in service model 40. These known transactions are transactions that were either observed or specified by a user. As part of the model building process, information describing an n+1th transaction of the same type has been added to service model 40 by the service model generator. This n+1th transaction, labeled transaction 201($n$+1), describes an "unknown" transaction of a known type of transaction. Such an unknown transactions is of a known type because it has the same command, command 211, as the other known transactions of this type. However, unlike the other known transactions of this type, unknown transaction 201($n$+1) can be used to respond to requests containing command 211 and "unknown" attributes that do not match those known (i.e., either observed or user-specified) attributes stored for transactions 201(A)-201($n$) (not shown). The information describing transaction 201($n$+1) thus includes information (e.g., wildcard information) identifying unknown attributes 221($n$+1), such that any request that includes command 211 and an attribute that does not match the observed attributes stored for the actual transactions (e.g., such as transactions 201(A) and 201(B)) will match the request information for transaction 201($n$+1).

The information describing transaction 221($n$+1) also includes default characteristics 231($n$+1) and default response 241($n$+1). These default values can be copied from the corresponding fields of an actual response of the same type. In some embodiments, the service model generator prompts a user to select the actual transaction from which these values should be copied. Alternatively, a user can be prompted to enter these values directly.

Information describing another set of transactions of a different type is also stored within service model 40. As shown, m+1 transactions, including transaction 202(A), 202(B), and 202($m$+1) of a type of transaction in which the request includes command 212 are stored in service model 40. Like transactions 201(A) and 201(B), transaction 202(A) is an observed transaction, and thus the information describing this transaction includes the observed command 212, observed attributes 222(1) (if any), observed characteristics 232(1) (if any), and observed response 242(1).

In contrast, transaction 202(B) is a user-specified transaction. This transaction was thus not observed and did not necessarily ever even occur. Instead, a user entered the information describing this transaction via a user interface. The information describing transaction 202(B) includes command 212, zero or more user-specified attributes 222(2), zero or more user-specified characteristics 232(2), and a user-specified response 242(2). In some embodiments, the user is prompted for entirely new information for each of these user-specified fields. In other embodiments, the user can be allowed to select an existing field (e.g., of another user-specified transaction or of an observed transaction) to copy into one or more of these fields. It is noted that a user can also create a user-specified transaction by modifying information describing an actual transaction. As FIG. 2 shows, user-supplied transaction information can be stored in the same model as transaction information captured by observing actual traffic exchanged between a requester and the service being modeled.

A final transaction, 202($m$+1), is an unknown transaction. The information describing transaction 202($m$+1) was added to service model 40 after m (an integer number, which does not necessarily have the same value as n) known transactions were described by the model. The information describing this unknown transaction 202($m$+1) can be used to handle requests of the same type (e.g., containing command 212) that specify unknown attributes. Accordingly, the information describing transaction 202($m$+1) includes command 212, unknown attributes 222($m$+1) (i.e., attribute information that will match any attributes not identified in the known attributes stored for the other m transactions of this type), default characteristics 232($m$+1), and default response 242 ($m$+1).

A final transaction 203 is also described in service model 40. Transaction 203 is an unknown transaction of unknown type. In other words, the information describing this transaction can be used to respond to any request of a type not already described by another row of service model 40. Accordingly, a request containing a command other than commands 211 and 212 could be responded to using the information describing transaction 203.

As shown, the information describing transaction 203 includes unknown command information 213, which is configured to match any command not already specified in service model 40, unknown attribute information 223, which is configured to match all attributes (if any) associated with unknown commands, default characteristics 233, and a default response 243. As with the default characteristics and responses associated with unknown transactions of known type, transaction 203's default characteristics and response can be user-specified.

Figure 3:
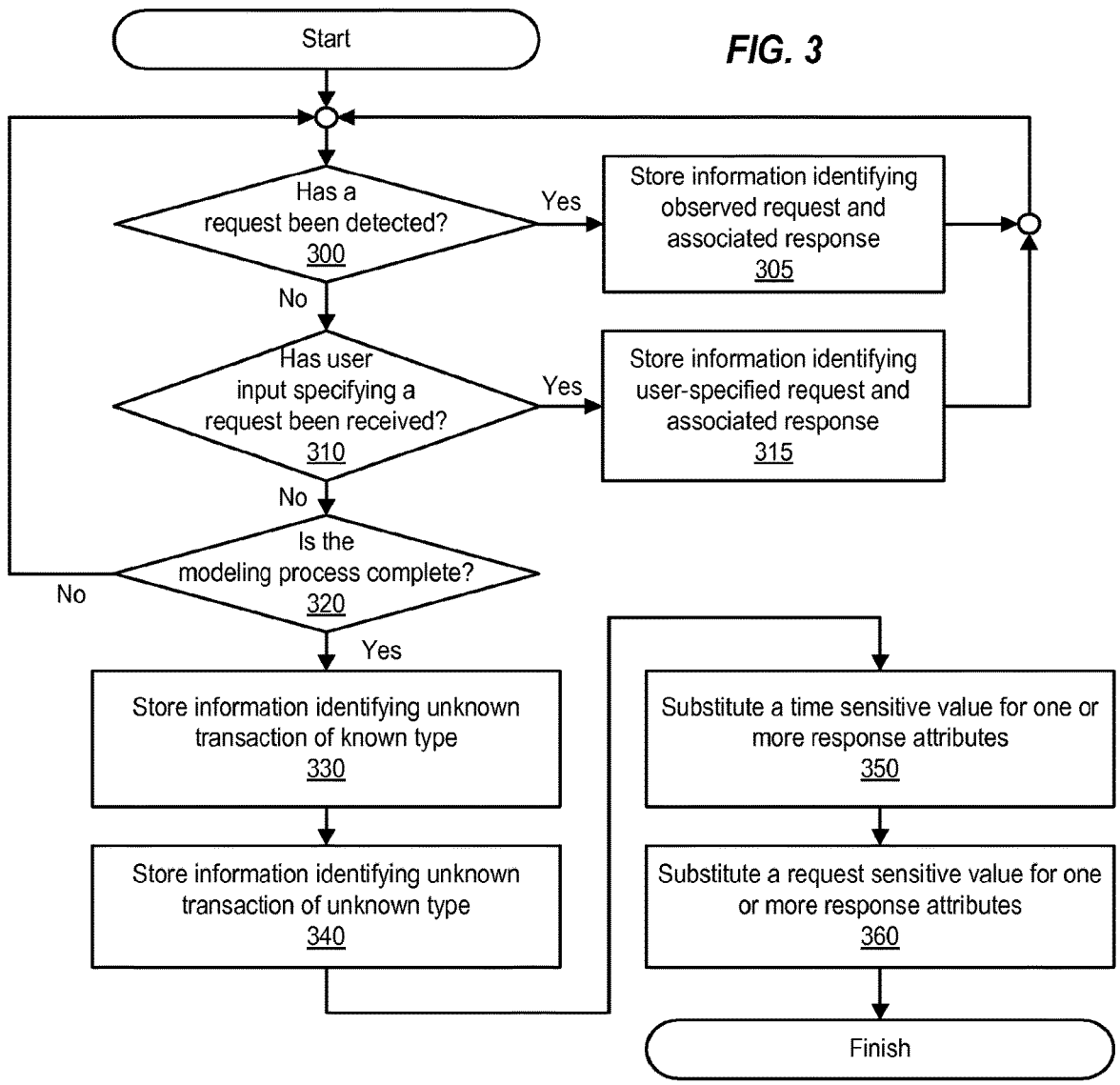
FIG. 3 is a flowchart of a method of generating a model of a service, according to one embodiment of the present invention.

FIG. 3 is a flowchart of a method of generating a model of a service. This method can be performed by a service model generator such as that shown in FIG. 1 in order to generate a service model like that shown in FIG. 2. The method is performed in response to model building being enabled, either in response to direct input of a start command (e.g., by a user selecting a start button in a graphical user interface) or in response to occurrence of a trigger (e.g., a prespecified time and/or date, or the occurrence of a pre-specified event or series of events).

The method begins at 300, where a service model generator determines whether a request has been detected. As noted above, detection of a request can vary depending upon the particular transport and/or data protocols in use between the requester(s) and the service being modeled. For example, detection of a request can involve monitoring a queue, intercepting method calls to an object, intercepting requests being sent to a web server or database application, or the like.

If a request is detected, information identifying the observed request (e.g., information describing the command included in the request, the attribute(s) included in the request, if any, and information describing one or more characteristics of and/or associated with the request, if desired) and the associated response (e.g., information describing the attribute(s) included in the response, as well as information describing one or more characteristics of and/or associated with the response, if desired) is stored as part of the service model, as indicated at 305.

Operations 300 and 305 can repeat indefinitely, until a user selects to end the model building process (or at least the portion thereof that generates information describing observed transactions) or until prespecified ending conditions are met.

At 310, a determination is made as to whether user input specifying a request has been received. This determination can be made, for example, by detecting whether a user has selected an option (in a user interface) to add additional transactions to and/or modify existing transactions in the service model.

If user input specifying a request has been received, information identifying the user-specified request (e.g., information describing a command and/or the attribute(s) included in the request, if any, and information describing one or more characteristics of and/or associated with the request, if desired) and the associated user-specified response (e.g., information describing the attribute(s) included in the response, as well as information describing one or more characteristics of and/or associated with the response, if desired) is stored as part of the service model, as indicated at 315.

While operations 300 and 310 are shown as taking place serially, these operations may be performed in parallel or in the opposite order shown in other situations and/or embodiments. For example, a user can initially enter information describing several user-specified transactions (e.g., by selecting a production log file), before enabling the service model generator to begin observing and recording actual transactions taking place. Similarly, in some embodiments, a user can select to enter information specifying a user-specified transaction while the service model generator is observing and recording actual transactions. In other embodiments, a user may not be allowed to enter user-specified transactions into the service model while transaction observation and recording is taking place. In still other situations, operation 310 may be performed and operation 300 may not, or vice versa.

At 320, a determination as to whether the model building process is complete is made. This determination can involve detecting whether the service model generator has stopped observing and recording actual transactions and/or whether a user has finished entering information describing user-specified transactions (e.g., as determined by the user selecting a "finish" option or other appropriate option from a user interface). Such a determination can also be made using other stimuli. For example, in one embodiment, this determination can be based upon whether a user has selected to save a service model (e.g., when the user saves a service model, that service model is assumed to be complete).

If the model building process has finished, the service model generator can perform additional processing. For example, the service model generator can store information identifying an unknown transaction of a known type, as shown in 330. This information includes information identifying a known type of request that includes one or more unknown attributes, as well as an associated response. Similarly, the service model generator can store information identifying an unknown transaction of an unknown type, as shown at 340. The information identifying the unknown transaction of unknown type can include information identifying an unknown command, information identifying unknown attributes, as well as information identifying default characteristics and a default response.

In addition to adding information describing unknown transactions of known and unknown types, other processing can also take place after the basic model building process completes. For example, in some embodiments, the service model supports time sensitive responses. In these embodiments, the service model generator processes the response information in the model in order to substitute time sensitive attributes for actual observed attributes, as shown at 350. Thus, an actual attribute "10:59 PM Oct. 1, 2009" can be replaced with a time sensitive value such as "[SYSTEM CLOCK+11 HOURS]". When the model is used to generate responses for the virtualized service, the time sensitive value is used to calculate the appropriate attribute to include in each response. Thus, if the model is being used to virtualize a service and the response attribute includes the time sensitive value [SYSTEM CLOCK+11 HOURS], the response generated based upon the model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

To generate the appropriate time sensitive response values, the service model generator can (as part of observation and recording of actual transactions) record information in the service model indicating the current system clock value (e.g., a time and/or date) at each time that a response is received by the service being modeled. Thus, for a given transaction, the characteristics for that transaction can include the system clock value (at the service being modeled) at the time that the request was received by the service being modeled.

After the model building process completes, the service model generator identifies which responses in the model, if any, should be modified to include time sensitive values. If there is no time value in the observed response, there is no need to modify the information describing the observed response to include a time sensitive value.

If instead there is a time value included in the observed response, the service model generator can then determine whether the corresponding request includes a time value as one of its attributes. If the corresponding request does include a time value, the service model generator can calculate the difference between the time value in the request and the time value in the response. This difference is then used to generate the time sensitive value, and the time value in the response is replaced with the time sensitive value. Thus, if the request includes the time value "Sep. 1, 2000" and the response includes the time value "Sep. 14, 2000", the response's time value can be replaced with the time-sensitive value "[REQUEST DATE+13 DAYS]".

If the corresponding request does not include a time value, the service model generator compares the time value in the response to the recorded system clock time in the transaction's characteristics. This difference is then used to generate the time sensitive value, and the time value in the response is replaced with the time sensitive value. For example, if the response includes the value 6:01 AM and the characteristics indicate that the service received the corresponding request at a system clock time of 5:59 AM, the time sensitive value is "[SYSTEM CLOCK+2 MINUTES]".

If there are multiple time values in the same response, the above procedure can be repeated for each different time value. Thus, if there are three time values in a response, three different time sensitive values can be calculated, and the existing time values can each be replaced by a corresponding time sensitive value.

In some embodiments, a user can modify an observed response to include a time sensitive value (e.g., by selecting to add a time sensitive value via a pull-down menu) or add a user-specified response that includes a time sensitive value. In such embodiments, the user can specify whether the time sensitive value depends upon a time value in the request or the system clock value as well as how the observable time (i.e., the system clock value or time value in the request) should be modified (e.g., by specifying an amount of time to be added to the observable time).

Another type of post-model building processing that the service model generator can perform involves replacing attribute values (e.g., strings) in the response information associated with unknown transactions of known type with request sensitive values, as shown at 360. The request sensitive values link an attribute included in the request to a value included in the response. For example, the information describing an unknown transaction of known type can specify that there are three attributes included in requests of that known transaction type. The response information for that unknown transaction can be modified to include a request sensitive value that indicates that the value of the third attribute of the request should be used as the value of the first attribute of the response, instead of an actual observed or user-specified value.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response.

To generate request sensitive values, the service model generator compares each request attribute in each known transaction with the response attribute(s) for the same transaction. If a match or other dependency is found, the service model generator can create a request sensitive value that identifies an attribute in the request and a dependency (if the dependency is one other than identity). For example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated. The service model generator then replaces the second response attribute for the unknown transaction of transaction type A with the request sensitive value.

In some embodiments, all known transactions of a given type are processed before the corresponding unknown transaction's response information is modified. The request sensitive value is used to replace one of the unknown transaction's response attributes only if all of the known transactions of that type exhibit the same dependency. In other embodiments, less stringent requirements are imposed (e.g., a replacement may be made if some but not all of the known transactions exhibit the same dependency).

A service model generator can perform other types of processing in addition to those described above. For example, service model generator can process information stored as part of the characteristics of each transaction in order to identify availability windows for the service, load patterns for the service, and the like. If patterns are identified, the service model generator can update the service model to include information identifying such patterns. For example, if an access window is identified for a particular type of transaction, the service model generator can modify the unknown transaction of that type to include a characteristic indicating that a response (or a particular type of response) will only be generated if the request is received during the identified access window.

Additionally, if the service model generator is recording stateful transactions, the processing performed after transactions are recorded can involve identifying and merging transactions into conversations, as is described in more detail below with respect to FIG. 6.

It is noted that a user can restart the model building process for a particular model subsequent to performance of processing operations like operations 330-360 (e.g., by restarting the observation and recording operations or by selecting to edit an existing model). In such situations, the processing operations, such as processing operations 330-

360, may be repeated, if needed, after the restarted model building process completes (e.g., if a transaction of a new type is added to the model, a corresponding unknown transaction of that type can be added to the model by repeating operation 330).

Figure 4:
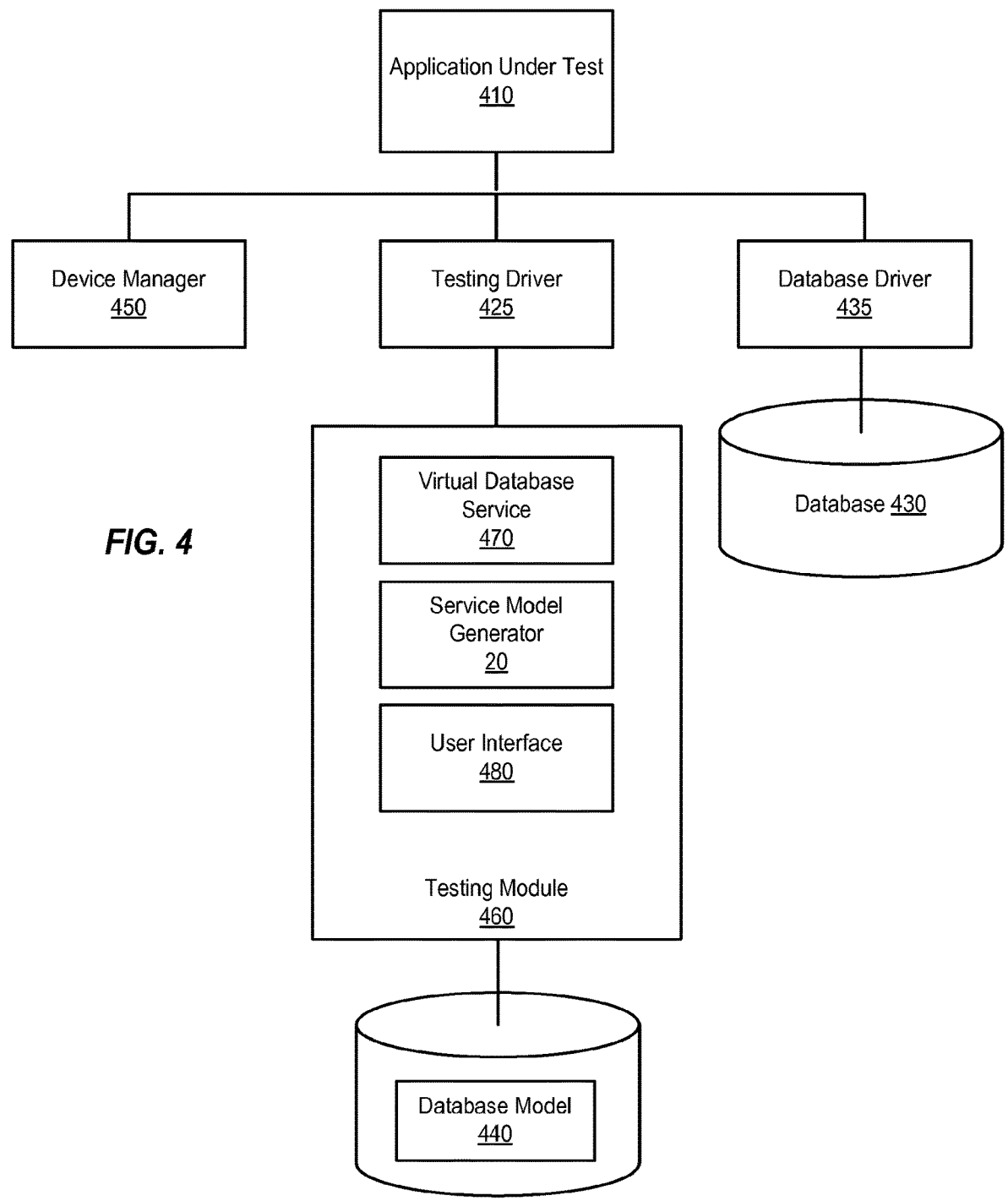
FIG. 4 is a block diagram of a system that presents a virtual database service, according to one embodiment of the present invention.

FIG. 4 is a block diagram of a system that presents a virtual database service. While a virtual database service is described in this example, it is noted that other types of services can be virtualized in a similar manner.

As shown, the system of FIG. 4 includes an application under test 410, a device manager 450, a testing driver 425, a database driver 435, a database 430, a testing module 460, virtual database service 470, service model generator 20, user interface 480, and database model 440. These components can be implemented on the same computing device in some embodiments. However, in many embodiments, various components can be implemented on different computing devices. For example, application under test 410, device manager 450, and testing driver 425 can be implemented on one computing device, while database driver 435 is implemented on another, and testing module 460 is implemented on yet another. Thus, the various components can be configured to communicate via a network.

In this example, testing module 460 includes both a service model generator 20 to generate database model 440 of database 430 and a virtual database service 470 that uses database model 440 to virtualize database 430. User interface 480 can be used to configure and control the model building process performed by service model generator 20, as described above, as well as to deploy the virtual database service 470.

In order to deploy virtual database service 470, a user selects database 430 for virtualization and causes database model 440 to be generated. The user then selects to deploy the virtual database service. Deployment involves starting a request processing module that is configured to use the appropriate service model to process requests. The request processing module can be deployed within a software container (e.g., a Java 2 Platform, Enterprise Edition (J2EE or JavaEE) container) devoted to providing virtual service environments. If desired, several instances of the request processing module, each of which uses the same service model, can be deployed at the same time. The executing request processing module accesses database model 440 in order to present virtual database service 470.

A related testing driver 425 or other testing module can also be deployed (e.g., if application under test 410 is not executing in the same container as the request processing module) on the client system (i.e., the system that includes the application under test) as part of the deployment process. This testing driver can be configured to provide requests generated by the application under test 410 to virtual database service 470, as well as to provide responses generated by virtual database service 470 to the application under test. A similar driver (or even the same testing driver) can also operate as part of service model generator 20 during the model building process described above.

In the illustrated embodiment, testing driver 425 causes database requests generated by application under test 410 to be provided to virtual database service 470 instead of database 430. Testing driver 425 first communicates with the driver manager 450 on the same system as application under test 410. Testing driver 425 has the driver manager 450 update the driver management information for that system to indicate that requests being sent to database driver 435 should actually be sent to testing driver 425. Testing driver 425 can then provide those requests to virtual database service 470.

Figure 5:
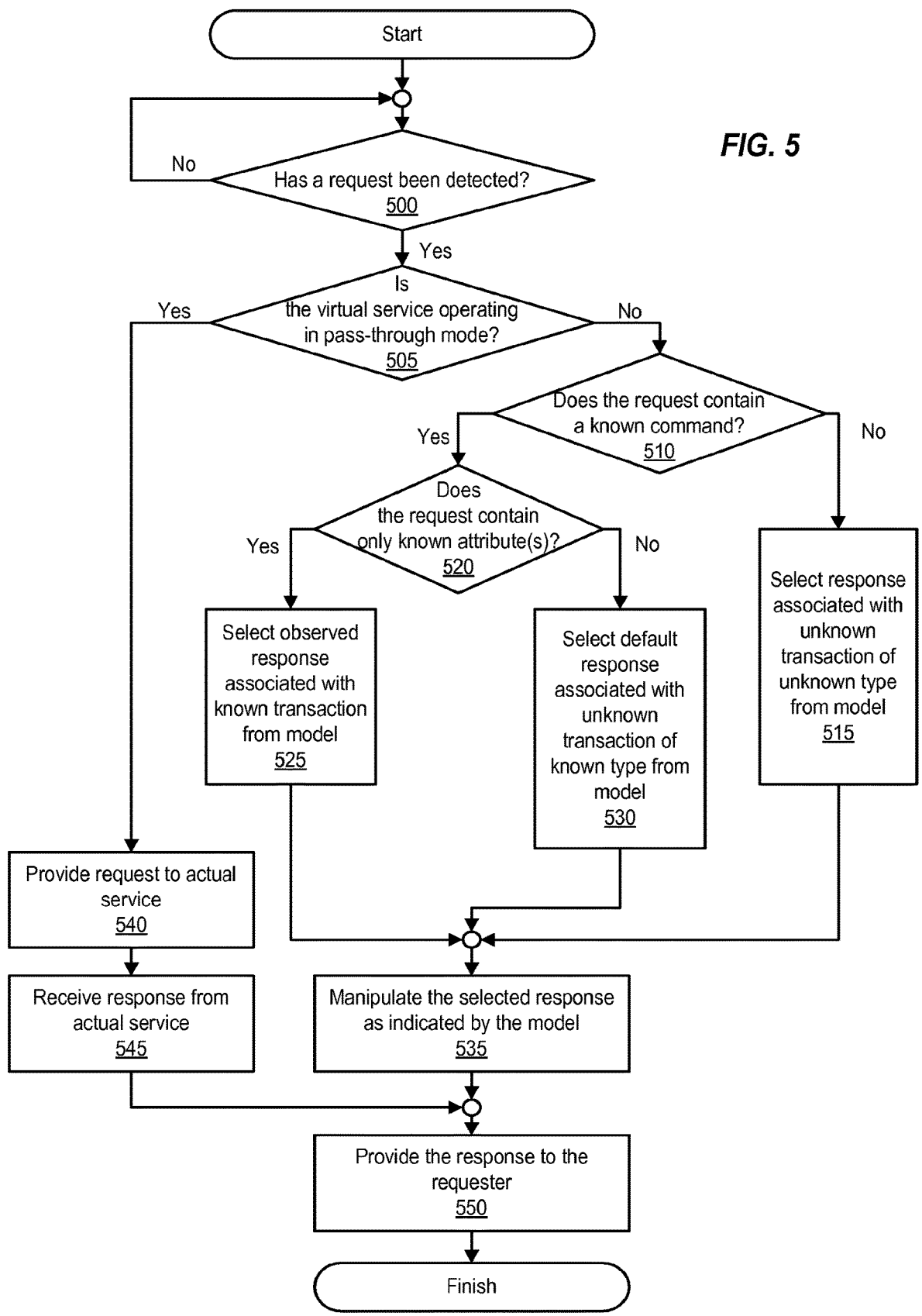
FIG. 5 is a flowchart of a method of presenting a virtual service, according to one embodiment of the present invention.

As requests are received from application under test 410, virtual database service 470 can use database model 440 to select responses to return to application 410. FIG. 5 provides an example of how a service model such as database model 440 can be used to select responses.

During the deployment process (or during ongoing use of the virtual database service), the user can interact with testing module 460 via user interface 480 in order to control how virtual database service 470 operates. For example, in one embodiment, the database service model 440 includes characteristic information for each transaction that controls how quickly responses are sent after requests are received. The user can use a slider bar or other input mechanism within user interface 480 to specify at what percentage speed the virtual database service 470 should operate, relative to the observed speed of database 430. For example, a user can select to have virtual database service 470 operate at 110% of observed speed in order to identify the effect of speeding up database 430 on application under test 410.

FIG. 5 is a flowchart of a method of presenting a virtual service. This method can be performed by a testing or training system in which a virtual service has been implemented. The virtual service includes a request processing module (e.g., as implemented as a process executing in a container) and a service model (e.g., such as service model 40 of FIG. 1) representing the service being virtualized. Several request processing modules can be deployed at the same time, and thus the various operations of FIG. 5 can be performed by different request processing modules operating at substantially the same time to virtualize the same service.

At 500, the request processing module waits for a request. If a request is detected, the request processing module then determines whether the virtual service is operating in pass-through mode, as shown at 505. In pass-through mode, the virtual service is not actually responding to requests. Instead, the virtual service is simply receiving requests and then forwarding those requests to the actual service being virtualized. In some embodiments, while the virtual service operates in pass-through mode, a service model generator can observe and record such requests by adding information describing those requests (and their corresponding responses) to the existing model of the service. A user can select whether to operate a virtual service is pass-through mode by selecting an option in a user interface. In some embodiments, the user can dynamically change the mode (pass-through or non-pass-through) in which the virtual service is operating while operation of the virtual service is ongoing (e.g., without having to stop and restart or undeploy and redeploy the virtual service).

If the virtual service is currently operating in pass-through mode, the request detected at 500 is provided to the actual service being virtualized, as shown at 540. A response can then be received from the actual service, as shown at 545. The received response can then be provided to the requester, as indicated at 550. In many embodiments, the same mechanisms used to send and receive requests and responses while generating a service model are also used to operate the virtual service in pass-through mode.

If the virtual service is not operating in pass-through mode, the request processing module determines whether the request is part of a transaction of a known type. In this example, this determination is made by determining whether the request contains a known command, as shown at 510. A known command is a command that was included in an actual observed or user specified transaction that is part of the service model for the service being virtualized. If the request does not contain a known command or is otherwise not part of a transaction of a known type (e.g., if the request does not contain the appropriate attributes), a response associated with an unknown transaction of unknown type is selected, as indicated at 510 and 515.

If instead the request is part of a transaction of a known type, a determination is made as to whether the request is part of a known transaction. This determination can involve detecting whether any of the attributes included in the request are unknown attributes (i.e., attributes having values that were not included in the actual observed and/or user-specified requests included in the service model), as shown at 520. If the request includes one or more unknown attributes, the request processing module selects a default response associated with the appropriate unknown transaction of known type in the model, as shown at 530. Otherwise, the request processing module selects the appropriate actual observed or user-specified response from a known transaction of known type from the model.

In some embodiments, determination of whether the attributes of the new request match the known attributes identified in the model is performed using an exact matching process. For example, regular expressions can be used to match a received request to the requests identified in the service model. Alternatively, less precise matching can be performed. For example, "starts with" or "contains" type matching can be performed as part of operation 520. These types of matching can thus identify that the new request matches an actual, known transaction, even if the new request's attributes differ somewhat from those in the actual, known transaction.

The request processing module can optionally manipulate the selected response in a manner indicated by the model, as shown at 535. For example, if the selected request includes a time sensitive value, the request processing module can use that time sensitive value to calculate an actual time value. The request processing module can then replace the time sensitive value in the response with the calculated time value. Similarly, if the selected response includes a request sensitive value, the request processing module can calculate the appropriate response attribute, as indicated by the request sensitive value, and then replace the request sensitive value with the calculated response attribute. Likewise, if the selected response is associated with a characteristic specifying an access window, and if the request was received outside of the specified access window, additional manipulation (e.g., to replace the stored response with an appropriate error message) can be performed. Many other types of manipulation can also be performed in response to information contained in the service model. Once the response has been manipulated, if needed, the final response can be returned to the requester, as shown at 550.

Figure 6:
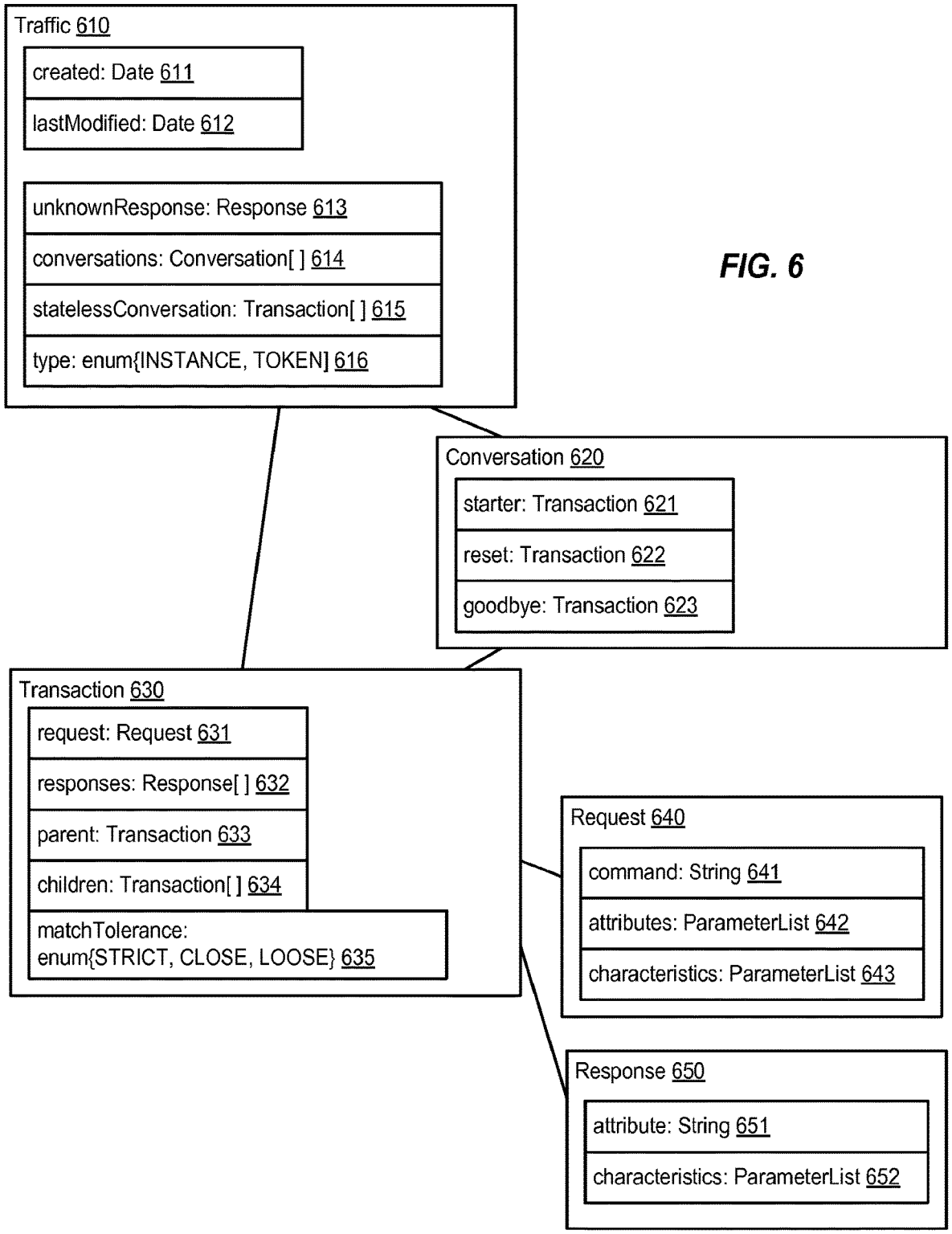
FIG. 6 is an illustration of a data model that can be used to store information representing both stateful and stateless transactions, according to one embodiment of the present invention.

FIG. 6 is an illustration of a data model that can be used to store information representing both stateful and stateless transactions. Service model information such as that shown in FIG. 2 can be stored in such a data model. As shown, the data model includes five data patterns: traffic pattern 610, conversation pattern 620, transaction pattern 630, request pattern 640, and response pattern 650.

Traffic pattern 610 can be used to store information identifying a particular service and the transactions that have been observed or otherwise added to the model of the identified service. Each service model can include a single instance of traffic pattern 610. As shown, traffic pattern 610 includes created field 611, which stores date information identifying when the service model of that particular service was initially created. Traffic pattern 610 also includes last-Modified field 612, which stores date information identifying the most recent time at which any of the information in the service model of the particular service was modified.

Traffic pattern 610 also includes an unknownResponse field 613. UnknownResponse field 613 stores information identifying the particular instance of the response pattern that stores information identifying the response to use for unknown transactions of unknown types. Accordingly, in embodiments employing the data pattern of FIG. 6, if an unknown transaction of unknown type is detected by a request processing module, the request processing module will use the response pattern instance identified in unknownResponse field 613 to generate a response.

Traffic pattern 610 includes conversations field 614. Conversations field 614 can identify one or more instances of conversation pattern 620. Conversation pattern 620 stores information representing a set of two or more stateful transactions. Such a set of stateful transactions is referred to herein as a conversation. The instance(s) of conversation pattern 620 identified in conversations field 614 identify all of the observed and/or user-specified conversations for the service being modeled. If the particular service being modeled does not include any stateful transactions (e.g., if a user has specified that the service only performs stateless transactions, or if no stateful transactions have been observed or specified by a user), conversations field 614 will not identify any instances of conversation pattern 620.

Traffic pattern 610 additionally includes statelessConversation field 615. This field can identify one or more instances of transaction pattern 630. Transaction pattern 630 stores information representing a transaction. Each instance of transaction pattern 630 identified in statelessConversation field 615 stores information identifying a stateless transaction that was either observed or specified by a user. StatelessConversation field 615 can identify instances of transaction pattern 630 associated with both known and unknown transactions of known types. If the particular service being modeled does not include any stateless transactions, statelessConversation field 615 will not identify any instances of transaction pattern 630.

Type field 616 can store one of two values: INSTANCE or TOKEN that identifies the type of stateful transactions, if any, provided by the service being modeled. Instance statefulness occurs when the communication protocol used by the service is itself stateful. When instance statefulness is used, each interaction between the service and a particular requester is handled by a separate instance of the service executing in its own memory space, such that interactions involving different requesters are handled by different instances of the service executing in different, independent memory space. Token statefulness occurs when the communication protocol used by the service is not itself stateful. When token statefulness is implemented, a single instance of the service interacts with all requesters. In token statefulness scenarios, each request and response can include tokens (e.g., such as "cookies" used in HTTP) that identify the particular requester that sent the request or should receive the response. In some embodiments, the value of this field is set automatically (e.g., by a service model generator) when a user selects the communication protocol(s) used to communicate with the service to be modeled.

As noted above, conversation pattern 620 stores information identifying a set of stateful transactions. A given service model can include n instances of conversation pattern 620, where n is an integer that is greater than or equal to zero.

Conversation pattern 620 includes a starter field 621. This field stores information identifying an instance of transaction pattern 630 associated with a starter transaction. The starter transaction is a transaction that acts as the first transaction in a stateful series of transactions (e.g., a login transaction). In at least some embodiments, all starter transactions are unknown transactions of known type, as will be described in more detail below. The particular transaction type to use as a starter transaction can be specified by a user during the service model configuration process.

Conversation pattern 620 also includes reset field 622. Reset field 622 stores information identifying one or more instances of transaction pattern 630, each of which is associated with a reset transaction (such a reset transaction can be a known or unknown transaction). The value of reset field 622 can be provided by a user (e.g., the user can be prompted to identify the reset transaction(s) for each conversation). A reset transaction is a transaction that, if detected, causes the flow of the conversation to return to the point just after performance of the starter transaction. For example, if a conversation includes four sequential transactions (where the starter transaction is the first of the four sequential transactions), and the reset transaction is detected just after performance of the third transaction in the conversation, the state of the conversation will return to the state that exists just after performance of the first transaction.

Conversation pattern 620 also includes a goodbye field 623. This field stores information identifying an instance of transaction pattern 630 associated with one or more goodbye transactions (of known or unknown type) for the conversation. A goodbye transaction is a transaction that causes the conversation to end. To reenter the conversation after a goodbye transaction is performed, the starter transaction for that conversation would need to be reperformed.

Transaction pattern 630 stores information identifying a transaction. Transaction pattern 630 includes request field 631, responses field 632, parent field 633, children field 634, and matchTolerance field 635. Transaction pattern 630 can be used to store stateful and stateless transactions (in some instances, the same transaction can occur both within a conversation and in a stateless situation where no conversation is currently ongoing). Transactions that are always stateless will not include values of parent field 633, children field 634, or matchTolerance field 635.

Request field 631 identifies the instance of request pattern 640 that stores information identifying the request (e.g., by command and attributes) portion of the transaction. Similarly, responses field 632 identifies one or more instances of response pattern 650 that store information identifying the response(s) that are part of that transaction. Each instance of response pattern 650 stores one response attribute (e.g., like those shown in FIG. 2), and thus if responses field 632 identifies multiple response patterns, it indicates that each of the identified response patterns should be used to generate a response when the corresponding request is received.

Parent field 633 stores a value identifying the instance of transaction pattern 630 associated with the transaction that occurs immediately before the current transaction in a conversation. Thus, if transaction pattern 630 stores information identifying the second transaction in a conversation (where the starter transaction is the first transaction in the conversation), parent field 633 can identify the instance of transaction pattern 630 associated with the starter transaction.

Similarly, children field 634 can store information identifying each instance of transaction pattern 630 associated with a child transaction of the current transaction. Thus, if transaction pattern 630 stores information identifying the second transaction in a conversation, children field 634 can store information identifying the instance of transaction pattern 630 that stores the third transaction in the conversation. It is noted that children field 634 can identify more than one transaction.

In some embodiments, parent field 633 and children field 634 only identify unknown transactions of known type. In such embodiments, known transactions are identified as properties of corresponding unknown transactions of the same type that occur at the same point in a conversation.

MatchTolerance field 635 stores one of three values: STRICT, CLOSE, or LOOSE. The stored value indicates the match tolerance for a request received immediately subsequent to the current transaction. Strict tolerance indicates that, if a conversation is ongoing, the request received immediately after the current transaction is only allowed to match transactions identified in the current transaction's children field 634. If a received request does not match one of the children transactions and is not a goodbye or reset transaction, the received request will be handled as an unknown transaction of unknown type, even if the service model does contain a matching transaction elsewhere.

If instead close tolerance is specified, the request received immediately after the current transaction can match any of the current transaction's children, as well as any of the current transaction's sibling transactions. Sibling transactions are all transactions that are identified in the children field of the transaction identified by the current transactions parent field. If the next request does not match any of these children or sibling transactions and is not a goodbye or reset transaction for the conversation, the next request will be handled as an unknown transaction of unknown type.

If loose tolerance is specified, even more transactions are candidates for matching the next received request. In one embodiment, loose tolerance indicates that the next request can match any of the current transaction's children transactions, sibling transactions, or parent transactions and parents' sibling transactions. In another embodiment, loose tolerance indicates that the next request can match any of the transactions included in the conversation, other than the starter transaction. If the next request does not match any of the transactions allowed by the loose tolerance and is not a goodbye or reset transaction for the conversation, the next request will be handled as an unknown transaction of unknown type.

Thus, the matchTolerance field 635 effectively identifies a subset of the transactions within the service model that are candidates for matching the next request received after the current transaction. The value of the matchTolerance field 635 can be set by a service model generator (e.g., based upon user input, a default configuration associated with the communication protocol used to communicate with the service being modeled, or the like). Different transactions within the same service model, as well as different transactions within the same conversation, can have different levels of match tolerance.

In some embodiments, only unknown transactions of known type have values in matchTolerance field 635, parent field 633 and/or children field 634. In such embodiments, one or more known transactions of known type can be identified as properties (not shown) of a corresponding unknown transaction of the same known type. In such a situation, the parent, child, and/or match tolerance of the corresponding unknown transaction will be used when processing a request received subsequent to one of the known transactions of known type.

Request pattern 640 includes a command field 641, attributes field 642, and characteristics field 643. Each instance of request pattern 640 stores information identifying a particular request. A service model generator can allocate an instance of request pattern 640 for each observed transaction, user-specified transaction, and unknown transaction of known type.

Command field 641 stores a string that identifies the command contained in the request. Attributes field 641 stores a parameter list that includes zero or more parameters, each of which represents an attribute of the request. The parameter list can include observed, user-specified, and unknown attributes, as discussed above with respect to FIG. 2.

Characteristics field 643 stores a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 643 can be used to generate time sensitive values, as well as to model actual conditions such as response timing and availability windows.

Response pattern 650 includes an attribute field 651 and a characteristics field 652. Attribute field 651 stores a string that represents a response attribute. As noted above, a given transaction can have multiple response attributes (e.g., responses field 632 of transaction pattern 630 can identify multiple instances of response pattern 650), and thus generating a response can involve accessing multiple response patterns in order to include the string identified in each of the response patterns' attribute field 651 in the response. Attribute field 651 can store a user-specified or observer response attribute, as well as values, like request sensitive values and time sensitive values, generated by the service model generator.

Characteristics field 652 stores a parameter list containing zero or more parameters. Each parameter identifies a characteristic of the response, such as the system clock time when the response was sent to the requester by the service, network and/or system conditions that were present when the response was sent, and the like.

Whenever a service model generator is observing and recording stateful transactions that are part of a conversation, the service model generator can first act to store information identifying each observed transaction (e.g., by storing information identifying each transaction in a transaction pattern 630, response pattern 640, and one or more response patterns 650. The service model generator can also store information identifying the order in which the recorded transactions were observed.

After the observation and recording process is complete, the service model can begin generating information identifying one or more conversations and updating the conversation-related fields of one or more transaction patterns. If the service supports token statefulness, the service model generator can then prompt the user to specify the starter transaction(s). For example, the service model generator can provide a list of all observed transactions to the user, and prompt the user to select which, if any, of those observed transactions are starter transactions.

The service model generator can identify all transactions that were part of the same conversation. When instance statefulness is implemented, a conversation will include all observed transactions for a given instance of the service; when token statefulness is implemented, a conversation will include all observed transactions that include the same token (e.g., as a request and/or response attribute), where each conversation begins with one of the user-specified starter transactions. Once transactions that are part of the same conversation have been identified, the service model generator can used the information identifying the order in which transactions were observed to place those transactions in temporal order.

The service model generator can then attempt to merge one or more conversations into a single conversation. For example, the service model generator can determine whether more than one of the conversations includes the same starter transaction. If so, the service model generator can merge those conversations into a single conversation that begins with the same starter transaction. If the starter transactions of multiple different conversations are not identical but are structurally similar transactions of the same type (e.g., if two conversations begin with start transactions that include the same command and the same number and type of attributes, but the actual attribute values differ), those conversations can also be merged into a single conversation.

For each conversation identified in this merging process (this includes conversations created by merging multiple other conversations, as well as independent conversations that cannot be merged with others), the service model generator can allocate an instance of conversation pattern 620 to store information identifying that conversation. As noted above, the starter transaction for each conversation is an unknown transaction of known type. Accordingly, if the service model does not already include an unknown transaction of that type, the service model generator can allocate an instance of transaction pattern 630 to store that unknown transaction. Once the unknown transaction acting as the starter transaction is included within the model, the starter field 621 of the conversation pattern 630 is updated to identify that unknown transaction.

If any known transactions of that type were observed (e.g., such as those that were merged in the above example) as the first transaction in the conversation, those transactions can then be added to the conversation as properties of the unknown transaction of that type. Adding these transactions to the conversation involves updating a properties field (not shown) of the unknown starter transaction to identify each of the known transactions of that type that were observed as starter transactions of the merged conversation.

This merging process can be repeated at each level of the conversation. For example, if four conversations, each of which includes at least three sequential transactions, are merged, the merging process can continue for each of the next two transactions within each conversation. Thus, after the known starter transactions are added as properties of the unknown starter transaction, the service model generator can observe the next transactions to occur within the merged conversation, and determine whether any of the next transactions can also be merged. The service model generator can also insert unknown transactions for each type of known transaction encountered in the conversation, and then add the known transactions as properties of those unknown transactions. Even if no merging is performed, an unknown transaction of known type will be included for each known transaction observed in a conversation. Parent and children fields are updated to indicate the flow of the conversation.

Figures 7A, 7B:
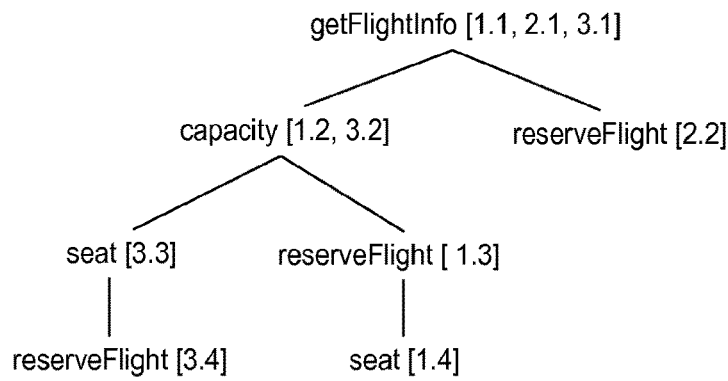
FIG. 7A shows an example of several stateful conversations that can be observed and recorded by a service model generator, according to one embodiment of the present invention.
FIG. 7B is an example of how several stateful conversations can be merged into a single conversation, according to one embodiment of the present invention.

For example, assume three conversations have been observed, as shown in FIG. 7A. These conversations all include commands that can be used with a computer reservation system used to reserve flights with one or more airlines. The first conversation includes transactions 1.1-1.4. Transaction 1.1 includes a request to "getFlightInfo" specifying an origination city CityA and a destination city CityB. The response (not shown) to this request includes a list of flights, if any, scheduled between CityA and CityB. Transaction 1.2 includes a request for the capacity of one of the flights provided in response to the "getFlightInfo" request, and a response (not shown) indicating whether that flight has any available capacity. Transaction 1.3 includes a request to reserve that flight, and a response (not shown) indicating whether or not the flight reservation was successful. Transaction 1.4 includes a request to hold a specific seat on the flight, and a response (not shown) indicating whether the request was successful.

The second conversation includes transactions 2.1-2.2. Transaction 2.1 includes a request to "getFlightInfo" specifying an origination city CityC and a destination city CityD. The response (not shown) to this request includes a list of flights, if any, scheduled between CityC and CityD. Transaction 2.2 includes a request to reserve one of those flights, and a response (not shown) indicating whether or not the flight reservation was successful.

The third conversation includes transactions 3.1-3.4. Transaction 3.1 includes a request to "getFlightInfo" specifying an origination city CityA and a destination city CityD. The response (not shown) to this request includes a list of flights, if any, scheduled between CityA and CityD. Transaction 3.2 includes a request for the capacity of one of the flights provided in response to the "getFlightInfo" request, and a response (not shown) indicating whether that flight has any available capacity. Transaction 3.3 includes a request to hold a seat on that flight, and a response (not shown) indicating whether or not the request was successful. Transaction 3.4 includes a request to reserve the flight, and a response (not shown) indicating whether the flight reservation was successful.

The service model generator then processes the observed transactions in order to build a tree representing the conversations, as shown in FIG. 7B. Initially, the service model generator identifies that the three conversations can be merged because all three start with the same type of known transaction: getFlightInfo, despite the fact that the observed attributes differ among each of the three starter transactions. In response to this identification, the service model generator identifies the unknown transaction of that type, getFlightInfo, as the starter transaction for the merged conversation and adds this unknown transaction to the service model (while a stateless unknown getFlightInfo transaction or other stateful unknown getFlightInfo transactions may already exist in the service model, none of these other transactions occur at the same point in the stateful conversation as this one, so a new unknown transaction will always be added). The service model generator then updates the unknown getFlightInfo transaction's properties to identify the known transactions 1.1, 2.1, and 3.1 that were observed at the same point in the conversation. These properties are shown in brackets in FIG. 7B.

The service model generator then examines the second transaction in each conversation to see if any of those transactions can be merged. Here, the first and third conversation each include a structurally similar second transaction of type "capacity." Accordingly, these two conversations can again be merged at the second transaction level. To do so, the service model generator creates a new instance of an unknown transaction of type capacity. The children field of the unknown getFlightInfo transaction is updated to identify the new unknown capacity transaction, and the parent field of the new unknown capacity transaction is updated to identify the unknown getFlightInfo transaction. The two known transactions 1.2 and 3.2 that were observed at this point in the first and third conversations are then added as properties of the unknown capacity transaction.

The second transaction in the second conversation, which is of type "reserveFlight," cannot be merged with the second transaction of the other two conversations, however. Accordingly, the service model generator will create a new unknown transaction of this type and update the children field of the unknown getFlightInfo to identify this new unknown reserveFlight transaction. Similarly, the parent field of the new unknown reserveFlight transaction is updated to identify the unknown getFlightInfo transaction. The single known transaction of this type (transaction 2.2) is then added as a property of the new unknown reserveFlight transaction.

Thus, after processing the second transaction in each of the three conversations, the service model will indicate that the unknown getFlightInfo starter transaction has two children, an unknown capacity transaction and an unknown reserveFlight transaction.

The service model generator then processes the third transaction in each conversation. As shown in FIG. 7A, only the first and third conversations include more than two transactions, and each conversation includes a different transaction at this point in the conversation. Accordingly, it is not possible to merge the transactions at this point in the conversation. As such, the service model generator creates a new unknown reserveFlight transaction to correspond to transaction 1.3, and a new unknown seat transaction to correspond to transaction 3.3. The children field of the new unknown capacity transaction is updated to identify both of these unknown transactions as children, and the parent field of the new unknown reserveFlight and seat transactions are updated to identify the unknown capacity transaction. The observed known transactions are added as properties of their corresponding unknown transactions, such that the unknown seat transaction identifies transaction 3.3 as one of its properties and the unknown reserveFlight transaction identifies transaction 1.3 as one of its properties.

It is noted that there are now two unknown reserveFlight transactions in the same conversation. Despite being unknown transactions of the same type, these two transactions have different values of their parent and children fields and properties. These differences reflect the fact that these transactions occur at different points within the conversation.

The service model generator then processes the final transactions 1.4 and 3.4 in the first and third conversations in the same manner as the previous transactions. Since the transactions that preceded these transactions could not be merged, these transactions also cannot be merged (furthermore, in this example these transactions can also not be merged since they are of different types. Accordingly, the service model generator adds a new unknown transaction for each of transactions 1.4 and 3.4. The new unknown reserveFlight transaction corresponding to transaction 3.4 lists transaction 3.4 as one of its properties, and the new unknown seat transaction corresponding to transaction 1.4 lists transaction 1.4 as one of its properties. The parent field of the new unknown reserveFlight transaction is updated to identify the preceding unknown seat transaction ("seat [3.3]" in FIG.

7B) and the parent field of the new unknown seat transaction is updated to identify the preceding unknown reserveFlight transaction ("reserveFlight [1.3]" in FIG. 7B). Similarly, the children fields of the preceding unknown transactions are updated, such that the children field of the preceding unknown seat transaction ("seat [3.3]") identifies the new unknown reserveFlight transaction ("reserveFlight [3.4]") and the children field of the preceding unknown reserveFlight transaction ("reserveFlight [1.3]") identifies the new unknown seat transaction ("seat [1.4]").

To use a service model that is implemented using the data pattern of FIG. 6, a request processing module can process each received request in the following manner. If no conversations are currently taking place, the request processing module can first determine whether a received request is part of any starter transaction by comparing the received request to the requests included in the starter transactions identified in each instance of conversation pattern 620 identified in conversations field 614. If so, the request processing module can select the appropriate instance of conversation pattern 620 (i.e., the instance whose starter field 621 identifies the transaction that matches the received request) in order to process subsequently received requests. The request processing module can also identify the appropriate instance of transaction pattern 630 associated with the transaction matching the received request in order to generate an appropriate response to be sent to the requester. Identifying the appropriate instance can involve examining each known transaction identified as a property of the starter transaction, in order to see if the new request matches a known transaction. If the new request matches a known transaction, that known transaction is used to respond. Otherwise, the unknown transaction is used to respond.

If the received request is not part of a starter transaction and no conversation is currently taking place, the request processing module can identify whether the request is part of one of the transactions identified in statelessConversation field 615. If a match is found, the request processing module can use the information associated with the matching transaction to generate a response to be sent to the requester. If no match is found, the request processing module can access the instance of response pattern 650 identified in unknownResponse field 613 and use the information stored within that response pattern instance to generate a response.

If a conversation is already taking place, the request processing module can determine whether the received request is a goodbye or reset transaction for the conversation (as identified by goodbye field 623 or reset field 622 of the instance of conversation pattern 620 associated with the ongoing conversation). If so, the information describing the matching goodbye or reset transaction can be used to generate a response, and the request processing module can update its state accordingly (e.g., to indicate that no conversation is currently ongoing if the request matched the goodbye transaction, or the move the state of the conversation back to the point after handling the starter transaction if the request matched the reset transaction).

If the received request is not a goodbye or reset transaction for the ongoing conversation, the request processing module can determine whether the request matches any of the transactions that are allowed to occur at that particular point in the conversation (e.g., as specified by the matchTolerance field 635 of the last transaction handled in the conversation). If so, the request processing module can use the matching transaction to generate a response. If a matching unknown transaction is found, the request processing module can first determine whether the received request matches any of the known transactions that are properties of the matching unknown transaction. If so, the request processing module can use the known transaction to generate a response. Otherwise, the request processing module can use the matching unknown transaction to generate the response.

If a conversation is already taking place, the received request is not a goodbye or reset transaction for the conversation, and the received request does not match any of the transactions that are allowed to occur at that particular point in the conversation, the request processing module will generate the response identified in unknownResponse field 613. This response will be generated even if the received request would have matched one of the other transactions included in the service model, since the request was received during a conversation. Reception of such a request may also cause the existing state of the conversation to be discarded, such that the next request received from the requester will be handled as if there is no ongoing conversation.

Figure 8:
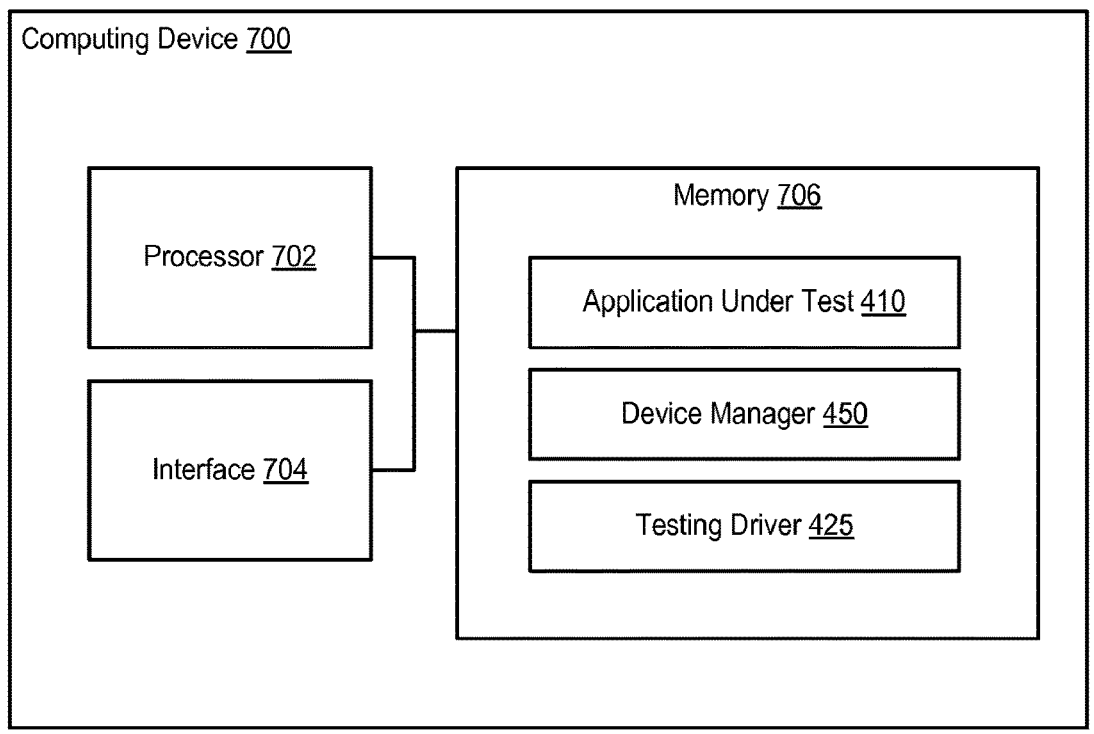
FIG. 8 is a block diagram of software that can be stored on a testing client, according to one embodiment of the present invention.

FIG. 8 is a block diagram of software that can be stored on a testing client. As shown, the testing client is a computing device 700 that includes a processor 702 (e.g., a microprocessor, programmable logic device (PLD), or application specific integrated circuit (ASIC)), one or more interfaces 704, and memory 706. Instructions executable by processor 702 are stored in memory 706. These instructions are executable to implement application under test 410, device manager 450, and testing driver 425. Computing device 700 can be a personal computer, server, personal digital assistant, cell phone, laptop, workstation, or the like. Memory 706 can each include various types of RAM (Random Access Memory), ROM (Read Only Memory), Flash memory, MEMS (Micro Electro-Mechanical Systems) memory, and the like. Processor 702, memory 706, and interface(s) 704 are coupled to send and receive data and control signals by a bus or other interconnect.

Interfaces 704 can each include an interface to a storage device on which instructions and/or data (e.g., such as data implementing a service model) are stored. Interfaces 704 can also each include an interface to a network, such as a local area network (LAN) or wide area network (WAN) such as the Internet, for use in communicating other devices. Such an interface can allow application under test 410 to send requests to services via a network. Similarly, such an interface can allow testing driver 425 to communicate with a testing module implemented on another computing device. Interface 704 can also include interfaces to various peripheral Input/Output (I/O) devices, such as a monitor, on which a graphical interface (e.g., allowing a user to configure and control the model building and/or model deployment process) can be displayed.

Figure 9:
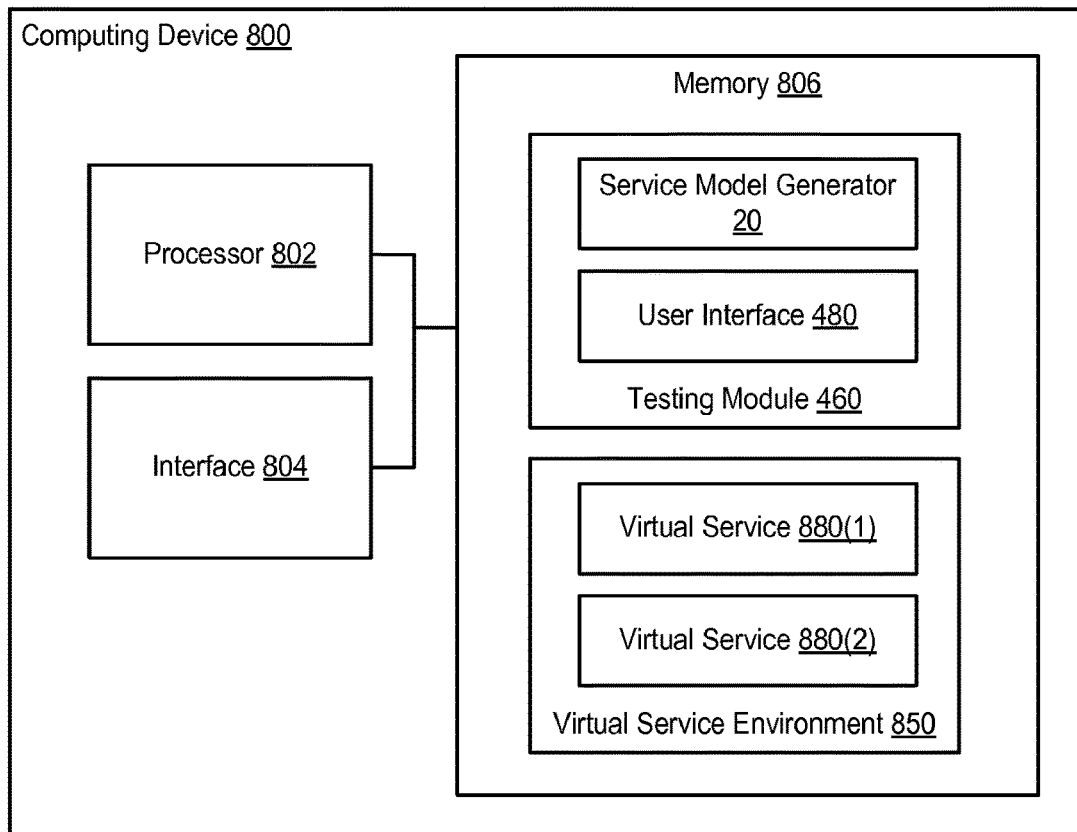
FIG. 9 is a block diagram of software that can be stored on a testing server, according to one embodiment of the present invention.

FIG. 9 is a block diagram of software that can be stored on a testing server. As shown, the testing server is implemented using computing device 800, which includes a processor 802 (e.g., a microprocessor, programmable logic device (PLD), or application specific integrated circuit (ASIC)), one or more interfaces 804, and memory 806. Instructions executable by processor 802 are stored in memory 806. These instructions are executable to implement testing module 460, which includes user interface 480 and service model generator 20, as well as virtual service environment 850 which includes virtual service 880(1) and virtual service 880(2). The two virtual services can be different instances of the same virtual service or different virtual services. Each virtual service can be implemented as a request processing module executing in a container, where the request processing module is configured to use a specific service model to determine how to respond to requests.

Like computing device 700, computing device 800 can be a personal computer, server, personal digital assistant, cell phone, laptop, workstation, or the like. Memory 806 can each include various types of RAM (Random Access Memory), ROM (Read Only Memory), Flash memory, MEMS (Micro Electro-Mechanical Systems) memory, and the like. Processor 802, memory 806, and interface(s) 804 are coupled to send and receive data and control signals by a bus or other interconnect.

Interfaces 804 can each include an interface to a storage device on which instructions and/or data (e.g., such as data implementing a service model) are stored. Interfaces 804 can also each include an interface to a network, such as a local area network (LAN) or wide area network (WAN) such as the Internet, for use in communicating other devices. Such an interface can allow virtual services 880(1) and 880(2) to receive requests and send responses via a network. Similarly, such an interface can allow testing module 460 to communicate with another computing device in order to, for example, deploy a testing driver. Interface 804 can also include interfaces to various peripheral Input/Output (I/O) devices, such as a monitor, on which a graphical interface (e.g., allowing a user to configure and control the model building and/or model deployment process) can be displayed.

In FIGS. 8 and 9, program instructions and data implementing various software components such as application under test 410, device manager 450, testing driver 425, service model generator 20, user interface 480, testing module 460, virtual service 880(1), and virtual service 880(2) can be stored on various computer readable storage media such as memory 706 and 806. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium. In one embodiment, the components used implement a service model generator, testing module, testing driver, and the like are implemented using LISA (Live Interaction Service Architecture) (TM), available from iTKO, Inc. of Dallas, Tex.

It is noted that the above figures illustrate specific examples. In other embodiments, different components can be used to implement the testing functionality described above. For example, while specific software components have been described as implementing specific functionality, this functionality can be implemented by different components than those depicted herein. For example, the functionality of service model generator 20 can be subdivided into multiple other test management components or integrated into another component within testing module 460. Furthermore, the specific components depicted in the figures herein can be combined or subdivided into fewer or additional components.

Additionally, other components can be used instead of and/or in addition to those shown in the figures presented herein. Such other components can provide different or additional functionality instead of and/or in addition to the functionality described herein. Furthermore, some of the functionality described herein can be eliminated in some embodiments.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method for generating a virtualized version of a particular software service implemented in a computing system, the method comprising:
   deploying a virtual service within a software container hosted by a particular computing system, wherein the virtual service is designated to use a service model corresponding to the particular software service;
   intercepting a request, from a requesting software component, directed to the particular software service, the request comprising a command;
   re-routing the request to the virtual service, wherein the service model is generated from transaction data describing a plurality of previously observed transactions involving the particular software service, each of the previously observed transactions comprises a respective observed request of the particular software service and a respective observed response of the particular software service to the observed request;
   generating a response by the virtual service, using a processor device of the particular computing system, to the received request based on the service model, wherein attribute values of the request are different from attribute values of the plurality of previously observed transactions and values in the response are generated based on the attributes of the request and a pattern in the service model based on the plurality of previously observed transactions; and
   sending the response from the virtual service to the requesting software component, wherein the response is sent to appear to originate from the particular software service.

2. The method of claim 1, wherein the request is received during a test of the requesting software component.

3. The method of claim 1, wherein the request is received during a training session involving the requesting software component.

4. The method of claim 1, further comprising determining that the received request is a request of an unknown transaction of a known type.

5. The method of claim 1, wherein the service model comprises a plurality of records comprising records of at least a portion of the plurality of observed transactions and the portion of the plurality of observed transactions comprises observed transactions of two or more transaction types.

6. The method of claim 5, further comprising identifying a particular transaction type from the request based on the command.

7. The method of claim 6, wherein the response is returned based on the identified particular transaction type.

8. The method of claim 1, wherein the request is a first request and the method further comprises:
   receiving a second request of the particular software service from the requesting software component, wherein the second request is different from the first request; and
   returning the requesting software component a second response, to the second request, generated from the virtual service.

9. The method of claim 8, further comprising:
identifying that the first request relates to the observed transaction, the observed transaction being of a first transaction type; and
identifying that the second request relates to a second transaction of a different, second type, wherein the first response is based on the identification that the first request relates to the observed transaction of the first transaction type and the second response is based on the identification that the second request relates to the second transaction of the second transaction type.

10. The method of claim 9, wherein the second transaction type is an unknown transaction type, wherein the second response comprises a default response.

11. The method of claim 8, further comprising:
identifying that the first request relates to the observed transaction comprising a first attribute, wherein the observed transaction is of a particular transaction type; and
identifying that the second request relates to a second transaction comprising a second attribute, the second transaction also of the particular transaction type, wherein the first response is returned based on the first attribute and the second response is returned based on the second attribute.

12. The method of claim 11, further comprising identifying that the first attribute is an unknown attribute.

13. The method of claim 8, further comprising identifying that the virtual service operates in pass-through mode when the second request is received, wherein the virtual service in pass-through mode forwards the second request to the particular software service.

14. The method of claim 13, further comprising:
monitoring responses by the particular software service to the second request; and
modifying the virtual service based on the monitoring.

15. The method of claim 8, wherein the second request comprises a particular request attribute and the second response is based on the request attribute.

16. The method of claim 15, wherein the virtual service matches the particular request attribute to an observed request attribute in the observed transaction and the second response comprises at least a portion of an observed response of the observed transaction based on the particular request attribute matching the observed request attribute.

17. The method of claim 1, wherein the attributes of the request comprise values in content of the request and one or more of the values in the response are generated based on one or more of the values in content of the request.

18. The method of claim 1, wherein the attributes of the request comprise timing information of the received request, the values of the response comprise a time-sensitive value identified in the service model, and generating the response comprises filling the time-sensitive value of the response based on the timing information.

19. The method of claim 1, further comprising identifying that the observed transaction is a stateless transaction, wherein the response is based on identifying that the observed transaction is stateless.

20. The method of claim 1, further comprising identifying that the observed transaction is a stateful transaction, wherein the response is based on identifying that the observed transaction is stateful.

21. A non-transitory computer readable medium having program instructions stored therein, wherein the program instructions are executable by a computer system to perform operations comprising:
intercepting from a requesting software component, a request directed to a particular software service, the request comprising a command;
deploying a virtual service within a software container hosted by a particular computing system, wherein the virtual service is designated to use a virtual service model corresponding to the particular software service, wherein the virtual service model models at least a portion of the particular software service, the virtual service model is generated from transaction data describing a plurality of previously observed transactions involving the particular software service, each of the previously observed transactions comprises a respective observed request of the particular software service and a respective observed response of the particular software service to the observed request;
generating a response by the virtual service to the received request based on the virtual service model, wherein attribute values of the request are different from attribute values of the plurality of previously observed transactions and values in the response are generated based on the attributes of the request and a pattern in the virtual service model based on the plurality of previously observed transactions; and
sending the response from the virtual service to the requesting software component, wherein the response is sent to appear to originate from the particular software service.

22. A system comprising:
a processor device;
a memory element;
a virtual service model stored in the memory element, wherein the virtual served model comprises:
a model of responses of a particular software service to received requests of the particular software service based on a plurality of previously observed transactions involving the particular software service, wherein each of the previously observed transactions comprises a respective request and a respective response, and the model identifies a pattern in the plurality of previously observed transactions; and
a virtual service engine to deploy a request processing module in a particular software container to implement a virtual service, wherein the request processing module is configured to:
intercept a request, from a requesting software component, intended for the particular software service;
generate a modeled response by the virtual service to the received request based on the virtual service model, wherein attribute values of the request are different from attribute values of the plurality of previously observed transactions and values in the response are generated based on the attributes of the request and the pattern in the plurality of previously observed transactions; and
return, to the requesting software component, from the virtual service, the modeled response in lieu of a response to the request by the particular software service.

23. The system of claim 22, wherein the content of the response is different from content of the observed responses of the plurality of previously observed transactions.

24. The system of claim 22, wherein the virtual service model is further based on a user-defined transaction.

* * * * *